Figure 1:
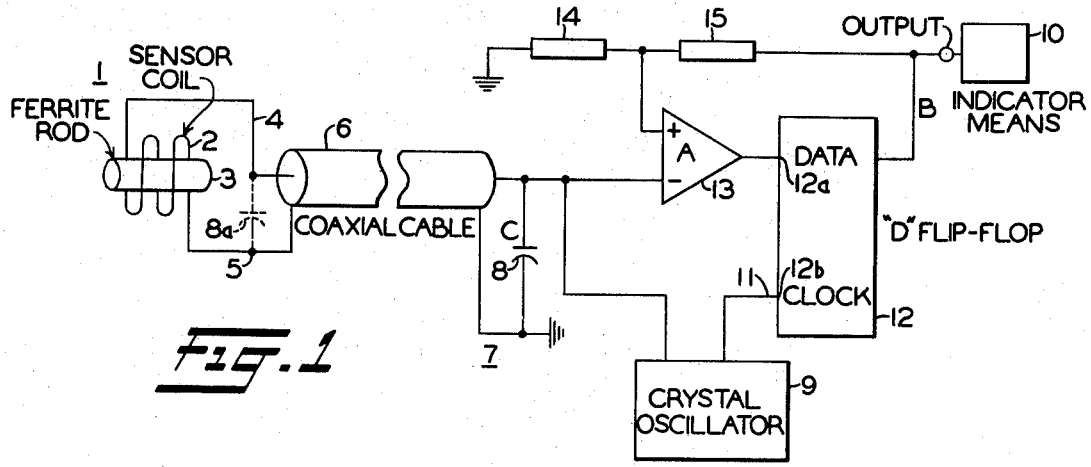

United States Patent [19] [11] 3,716,787
Hammond [45] Feb. 13, 1973

[54] APPARATUS FOR MONITORING SPEED UTILIZING A TUNED CIRCUIT WHOSE PHASE CHANGES IN PROPORTIONAL TO SPEED

[75] Inventor: Peter W. Hammond, Chargin Falls, Ohio

[73] Assignee: Westinghouse Air Brake Company, Wilmerding, Pa.

[22] Filed: Nov. 27, 1970

[21] Appl. No.: 93,116

[52] U.S. Cl. ......................324/173, 73/518, 317/5, 340/263
[51] Int. Cl. ...............................................G01p 3/56
[58] Field of Search...324/173, 174, 179, 34 P, 34 D, 324/41, 83 A; 317/5; 340/195, 196, 197, 199, 263, 271, 38 R, 38 L; 332/20, 29 M; 73/518, 520

[56] References Cited

UNITED STATES PATENTS

| 3,505,595 | 4/1970 | Favre | 324/160 |
|---|---|---|---|
| 3,560,854 | 2/1971 | Moss | 324/161 |
| 3,525,044 | 8/1970 | Richmond | 324/173 |
| 2,943,306 | 6/1960 | Gray | 324/41 |

OTHER PUBLICATIONS

Kretzmer, E.; Measuring Phase at Audio and Ultrasonic Frequencies; Electronics; Oct. 1969; pp. 114–118.

Primary Examiner—Robert J. Corcoran
Attorney—Ralph W. McIntire, Jr.

[57] ABSTRACT

A motion detector system using a pulse tachometer comprising a wheel of non-magnetic, non-conductive material such as fiber or Teflon having a plurality of equally spaced magnetically distinct pins in the periphery which move into proximity of a pick-up coil of a tuned circuit to vary the impedance therein. Varying the impedance effects a circuit phase-shift which is compared with a predetermined reference phase of voltage and current in said circuit to provide an indication of any movement of the wheel and a measurement of the speed of movement in a measured time interval.

4 Claims, 3 Drawing Figures

PATENTED FEB 13 1973 3,716,787

INVENTOR.
PETER W. HAMMOND
BY Ralph W. McIntire, Jr.
ATTORNEY

APPARATUS FOR MONITORING SPEED UTILIZING A TUNED CIRCUIT WHOSE PHASE CHANGES IN PROPORTIONAL TO SPEED

BACKGROUND OF INVENTION

Several types of so-called "incremental encoders" or "tachometer systems" are presently utilized to measure shaft angle changes or speed of revolution of a shaft or wheel, among those being a light beam impinging on a photocell through a rotating perforated disc, or a magnetic reluctance type which measures a rate of change in reluctance of a circuitry as a magnetic gear tooth passes an included pick-up at a speed proportional to the rotating speed of the gear tooth on a wheel or shaft. Both of these systems are subject to undesirable effects and possible misleading indications for various reasons. The optical types can be easily rendered inaccurate by vibration and temperature changes, while the reluctance types can be easily contaminated by outside ferrous particles and rendered inaccurate in addition to being inoperative below certain minimum speeds. It is therefore desirable to develop an inexpensive tachometer with extreme sensitivity which will accurately indicate speed changes regardless of low speeds, high vibration, extreme temperature changes and contamination by ferrous particles.

SUMMARY OF INVENTION

According to the present invention there is provided a vehicle tachometer of the magnetic proximity type which instead of measuring the effective resistance or voltage frequency changes of a circuit, a phase measuring circuit is utilized which measures the change in the inductance of a sensor coil as effected by the proximity of magnetically distinct pins on a disc of non-magnetic, non-conductive material such as fiber or Teflon. The disc is rotated so as to move the respective pins into and out of proximity of the sensor coil at a rate according to the rate of speed of the vehicle in a manner to instantaneously read any speed changes. The proximity of the magnetically distinct pins to the sensor coil changes the inductance of the circuitry to effect a voltage versus current phase-shift in said circuit which occurs at a rate proportional to the speed of the vehicle and is utilized as an accurate indication thereof.

Figure 2:
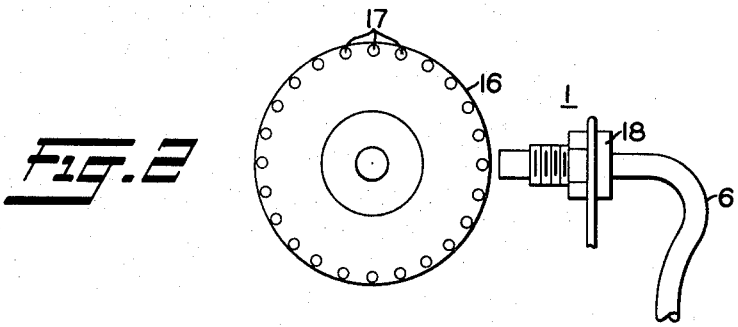
Figure 3:
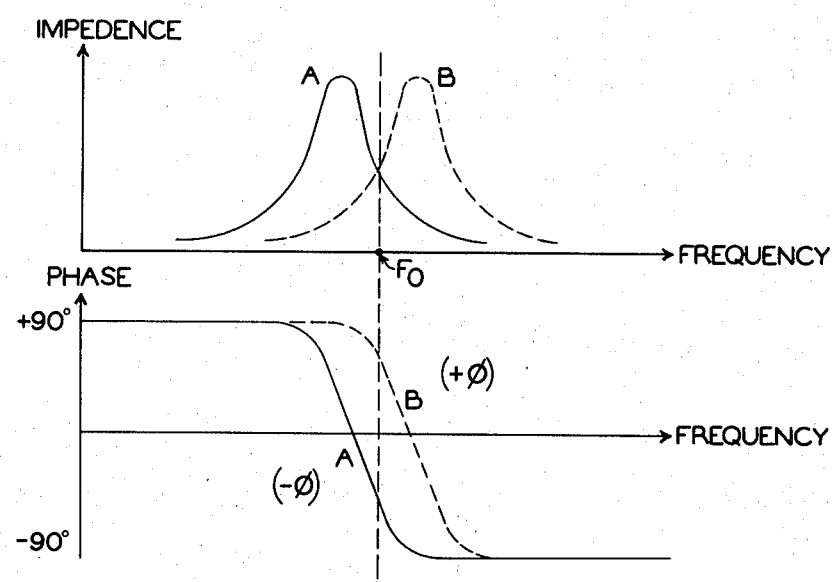

Referring to the drawing, there is shown in FIG. 1 a block diagram of the tachometer circuitry;

FIG. 2 is a partial view of the axle mounted disc showing the magnetically distinct pins and their relative positioning with respect to the tachometer sensor or pick-up; and FIG. 3 shows characteristic plots of frequency versus impedance and the resultant phase shift under different orientations.

DESCRIPTION

Referring to FIG. 1 of the drawings, there is shown a block diagram of a circuitry wherein a change of inductance therein effects a phase-shift that is measured as a position change. This system includes a proximity detector or sensor means 1 comprised of a sensor coil 2 into which is inserted a ferrite core 3. The sensor coil 2 is part of a closed loop timing circuit including wires 4 and 5, coaxial cable 6 leading to a remotely located tuning capacitor 8 and a high frequency constant current source such as a crystal oscillator 9. The tuning capacitor 8 may be located near the sensor coil 2 to reduce cable current and cable losses to obtain more phase-shift. This alternate location of capacitor 8 is shown dotted as 8a.

The crystal oscillator 9 includes signal shaping elements such as wave shapers and frequency dividers (not shown) as necessary to provide both a fixed frequency digital signal to the clock portion 11 of a flip-flop amplifier 12, and an identical frequency current signal to the tuned circuitry. The current signal to the tuned circuitry is modified by the sensor coil 2 (explained hereinafter) and supplied via an amplifier 13 to the "Data" input 12a of the flip-flop amplifier 12 to provide a digital output signal therefrom. This output can be directly counted, or converted by a digital to analog converter to an analog signal; either method will permit measuring the degree of movement or speed of movement by indicator means 10. A plurality of biasing resistors 14 and 15 are associated with the amplifier 13 for selecting operating levels and to create a hysteresis effect by feedback of a small amount of voltage from the output of flip-flop amplifier 12 to the input of amplifier 13. The flip-flop amplifier may be of the commercially available "Texas Instrument" type SN7474 containing two "D" type flip-flops, only one of which is used.

FIG. 2 shows the relative positioning of an axially driven disc 16 of non-magnetic, non-conductive material such as fiber or Teflon, said disc having equally spaced slugs or pins 17 around the perimeter thereof in a manner that rotation of the disc 16 causes the pins 17 to pass by the sensor means 1 (FIG. 1) mounted in a casing 18 and connected to the circuitry system (FIG. 1) by the usual coaxial cable 6. A greater change of inductance in the tuned sensor circuitry results by using small magnetically distinct pins 17 on a magnetically transparent background, therefore the disc 16 is of a non-magnetic, non-conductive material.

OPERATION

In operation, any movement of the vehicle on which the disc 16 is mounted, will cause rotation of said disc to move the pins 17 into and out of proximity of the sensor coil as they rotate, to repeatedly vary the inductance of the sensor coil.

A constant high-frequency current is supplied to the sensor circuitry by a high impedance driving source such as an output from the crystal oscillator 9. Each individual magnetically distinct pin 17 is rotated near the sensor means. With ferrite pins, the pin reduces the magnetic reluctance and hence increases the inductance. With solid metal pins, the resultant eddy currents induced therein oppose the field of the coil 2 to reduce the inductance. A capacitor 8 (alternate located capacitor 8a may be utilized) is connected in parallel with the coil 2 and is adjusted when the sensor is between two pins to form a tuned circuit having an impedance characteristic as shown on the top diaphragm of FIG. 3 by curve B for ferrite pins, and curve A for solid metal pins. As each pin 17 is moved near the coil 2, the resultant impedance is increased for ferrite pins and decreased for solid metal pins to lower or raise respectively the tuned frequency of the tuned sensor circuitry thereby shifting both the phase and impedance characteristic of the circuitry as shown at the top diaphragm of FIG. 3 by curve A for ferrite pins and curve B for solid metal pins.

If the tuned circuitry is continuously excited from the oscillator 9 at a predetermined frequency ($Fo$) selected between the tuned frequency when a pin 17 is near the sensor 1 and again when there is no pin 17 near the sensor 1; thus, as shown in the bottom diagram of FIG. 2, using ferrite pins, a negative phase-shift ($-\phi$) indicates that the pin 17 is in the proximity of the sensor to render the circuitry more inductive, while positive phase-shift ($+\phi$) indicates no pin near the sensor to render the circuitry more capacitive, and reversely using solid metal pins, a positive phase-shift ($+\phi$) indicates proximity of pin and sensor to render the circuitry more caparative while a negative phase-shift ($-\phi$) indicates no pin near the sensor to render the circuitry more inductive. If the effective resistance of the circuitry is high, only a small change of inductance will cause a relatively large phase-shift. It is this unique measuring and comparing of phase-shifting regardless of the pin material that provides the basis for the present motion indicator or tachometer.

An understanding of the basic circuitry described herein is not essential to the understanding of the present invention wherein the novel measurement of phase-shifting in the tuned circuitry indicates unique and accurate measurement of motion regardless of the incremental degree of such movement. Briefly stated, such circuitry functions as described herein.

A reference signal and a measured signal are compared at a well-known flip-flop amplifier 12 having a "Data" input 12a and a usual "Clock" input 12b to the clock portion 11 thereof. The reference signal is supplied by the crystal oscillator 9 to the usual "Clock" input 12b, being modified by auxiliary circuitry (not shown) into square wave form. The measured signal is supplied by the oscillator 9 to the tuned circuitry where it is accordingly modified by the presence or lack of presence of a pin 17 near the sensor 1 and supplied to the amplifier 13 where it is clipped and supplied in square wave form to the "Data" input 12a of the flip-flop amplifier 12. A feedback circuitry is supplied from the output of the flip-flop amplifier 12 to the amplifier 13 via a biasing circuitry to provide hysteresis by shifting the effective voltage level at the amplifier 13 to add or subtract a limited D-C voltage thereto. By way of example, if a ferrite pin 17 is near the sensor 1, the phase of the output of amplifier 13 to the date input of flip-flop 12 will lag the "Clock" input so that when the clock input goes from a logic "0" to a logic "1" state the data input will still be a logic "0" and an "0" output state will be indicated by the flip-flop amplifier 12. If no ferrite pin 17 is near the sensor 1, the phase of the output of amplifier 13 to the "Data" input 12a will lead the "Clock" input 12b when the clock goes from a logic "0" state to a logic "1" state and a logic "1" output state will be indicated by the flip-flop amplifier 12 at the output thereof. The digital output of the flip-flop amplifier 12 can be counted, or the frequency of change thereof can be measured by a digital to analog converter and indicator means 10 to indicate any movement of the pins relative to the sensor to indicate motion and speed of such motion as desired.

Having now described the invention, what I claim as new and desire to secure by Letters Patent, is:

1. Speed detector apparatus comprising in combination:
   a. a tuned circuit including a coil and a capacitor,
   b. oscillator means for supplying a fixed frequency excitation signal at the input of said tuned circuit,
   c. speed responsive means comprising:
      i. a non-magnetic, non-conductive rotatable disc member arranged with the periphery thereof in close relationship with said coil, and
      ii. a plurality of magnetically distinct pin means spaced around the periphery of said disc member to vary the inductance of said tuned circuit in accordance with the presence or absence of a pin in proximity with said coil to effect a leading or a lagging phase shift in the output of said tuned circuit relative to said resonant frequency thereof, and
   d. comparison means subject to said fixed frequency excitation signal and the output of said tuned circuit for detecting said leading or lagging phase shift of said tuned circuit output.

2. Speed detector apparatus, as recited in claim 1, further comprising means for registering the frequency of detection of said leading or lagging phase shift as an indication of the speed of rotation of said disc member.

3. Speed detector apparatus, as recited in claim 1, further characterized in that said comparison means comprises:
   a. signal modifying means for amplifying and shaping said phase shifted output of said tuned circuit, and
   b. a bistable flip-flop device having a first input subject to said modified output of said phase shifted signal, a second input subject to said excitation signal of said oscillator means and an output provided so long as said first input is present at the transition of said excitation signal from one digital state to another.

4. Speed detector apparatus, as recited in claim 3, further characterized in that the output of said flip-flop biases said signal modifying means so as to effect a predetermined variation of said phase shift output and thereby extend the duration said first input is present at said flip-flop.

* * * * *